(12) United States Patent
Nagai et al.

(10) Patent No.: US 7,949,071 B2
(45) Date of Patent: May 24, 2011

(54) SIGNAL PROCESSING SYSTEM AND INFORMATION STORAGE MEDIUM

(75) Inventors: Yuji Nagai, Sagamihara (JP); Chosaku Noda, Yokohama (JP); Kazuo Watabe, Yokohama (JP); Akihito Ogawa, Fujisawa (JP); Kazuto Kuroda, Yokohama (JP); Nobuhisa Yoshida, Kamakura (JP); Nobumasa Naito, Ome (JP); Naoki Morishita, Yokohama (JP); Naomasa Nakamura, Yokohama (JP); Hideaki Ohsawa, Yokohama (JP); Hiroharu Sato, Tokyo (JP); Hisashi Yamada, Yokohama (JP); Toshihiko Kaneshige, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1 day.

(21) Appl. No.: 12/626,338

(22) Filed: Nov. 25, 2009

(65) Prior Publication Data

US 2010/0135436 A1 Jun. 3, 2010

(30) Foreign Application Priority Data

Nov. 28, 2008 (JP) ................. 2008-304832

(51) Int. Cl.
*H03C 1/52* (2006.01)
*G06K 9/00* (2006.01)
(52) U.S. Cl. ...................... 375/300; 382/100
(58) Field of Classification Search .......... 375/268, 375/300; 713/176; 704/273; 382/100
See application file for complete search history.

(56) References Cited

U.S. PATENT DOCUMENTS

| | | | |
|---|---|---|---|
| 6,331,969 B1 | 12/2001 | Kobayashi et al. | |
| 7,196,994 B2 | 3/2007 | Yamaoka et al. | |
| 7,248,558 B2 | 7/2007 | Kobayashi et al. | |
| 2004/0037184 A1 | 2/2004 | Moriya et al. | |
| 2005/0174909 A1 | 8/2005 | Horigome et al. | |
| 2005/0175216 A1* | 8/2005 | Bloom et al. | 382/100 |
| 2006/0062115 A1 | 3/2006 | Nagai et al. | |
| 2009/0262932 A1* | 10/2009 | Petrovic | 380/255 |

FOREIGN PATENT DOCUMENTS

| | | |
|---|---|---|
| EP | 1 526 531 | 4/2005 |
| JP | 2000-3560 | 1/2000 |
| JP | 2001-43141 | 2/2001 |
| JP | 2002-513982 | 5/2002 |

(Continued)

OTHER PUBLICATIONS

Extended European search report for Application No. 09172770.1, European Patent Office, mailed Jan. 4, 2010.

*Primary Examiner* — Kevin Y Kim
(74) *Attorney, Agent, or Firm* — Finnegan, Henderson, Farabow, Garrett & Dunner, L.L.P.

(57) ABSTRACT

According to one embodiment, a first encoder encodes main information, a second encoder encodes sub-information, a first modulator modulates a carrier based on an output of the first encoder, a duplicating module duplicates an output of the second encoder to generate encoded sub-information units, and a second modulator amplitude-modulates an output of the first modulator based on the encoded sub-information units. The second modulator amplitude-modulates with $\sigma/(\mu \times (2^N)^{1/2})$ being 0.4 or less, wherein a noise power of a transmission path or a storage medium is $\sigma^2$, a number of the encoded sub-information units is N, signal levels after amplitude modulation, which correspond to bit 1 and bit 0 of the encoded sub-information units, are A and B, and a level difference A−B is μ.

1 Claim, 9 Drawing Sheets

FOREIGN PATENT DOCUMENTS

| | | |
|---|---|---|
| JP | 2003-511725 | 3/2003 |
| JP | 2003-109302 | 4/2003 |
| JP | 2003-122637 | 4/2003 |
| JP | 2003-168262 | 6/2003 |
| JP | 2004-110866 | 4/2004 |
| JP | 2004-139700 | 5/2004 |
| JP | 2004-213781 | 7/2004 |
| JP | 2007-228564 | 9/2007 |
| WO | WO 99/57723 | 11/1999 |
| WO | WO 01/26110 | 4/2001 |
| WO | WO 2004/036560 | 4/2004 |
| WO | WO 2006/136986 | 12/2006 |
| WO | WO 2008/134255 | 6/2008 |

* cited by examiner

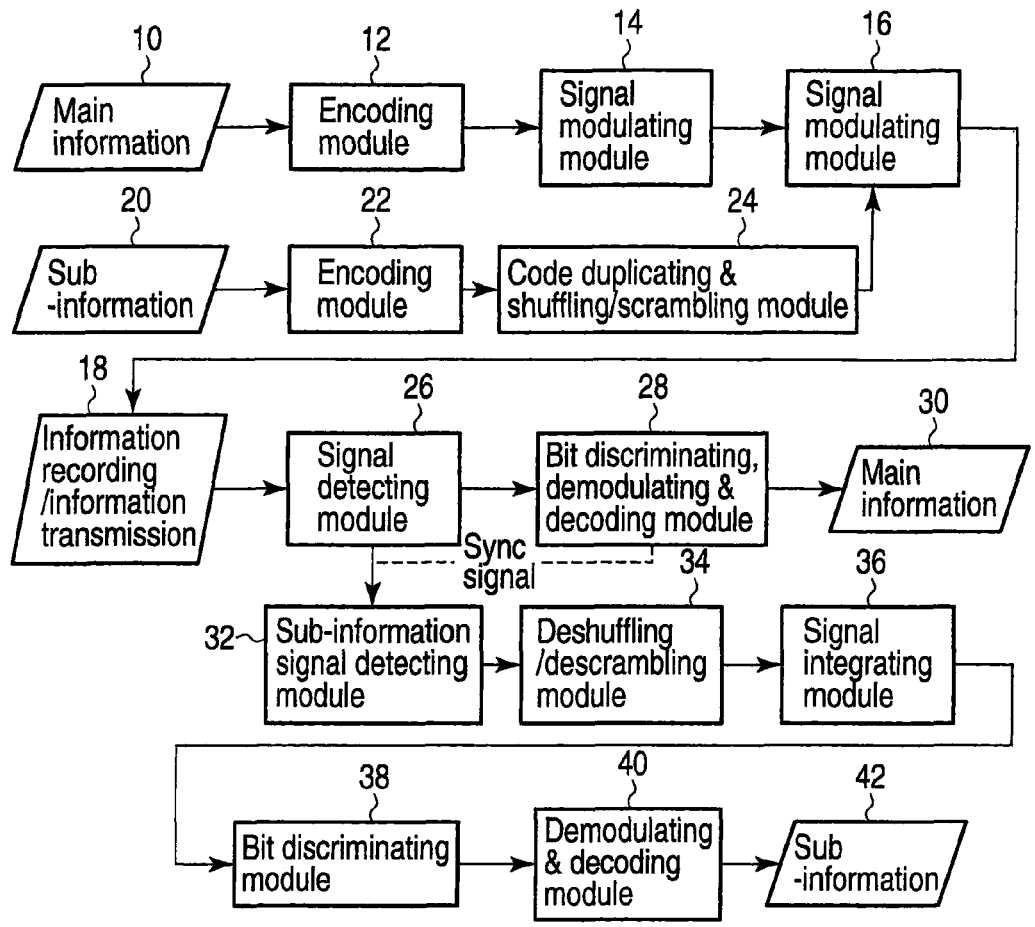
F I G. 1
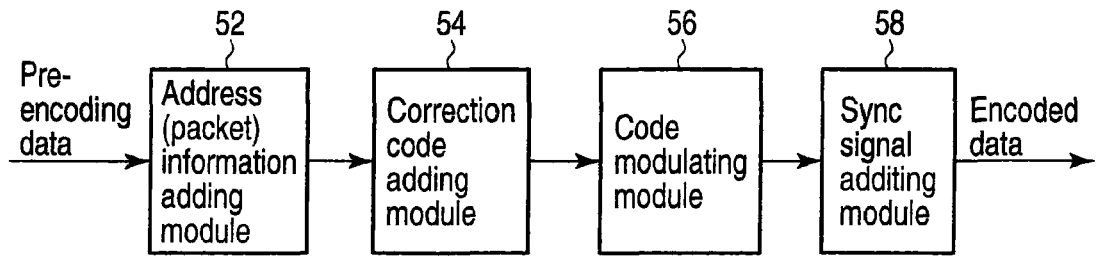
F I G. 2

| Secondary Data Block |||||||
|---|---|---|---|---|---|---|
| Secondary Information |||| Secondary Data Parity |||
| m bytes (or bits) |||| n bytes (or bits) |||
| $D_0$ | $D_1$ | ... | $D_{m-1}$ | $D_m$ | $D_{m+1}$ | ... | $D_{m+n-1}$ |

| | Secondary Data Unit |||||
|---|---|---|---|---|---|
| | m+n bytes (or bits) |||||
| Unit #0 | $B_{0,0}$ | $B_{0,1}$ | ... | $B_{0,m+n-2}$ | $B_{0,m+n-1}$ |
| Unit #1 | $B_{1,0}$ | $B_{1,1}$ | ... | $B_{1,m+n-2}$ | $B_{1,m+n-1}$ |
| ... | ... | ... | ... | ... | ... |
| Unit #N-1 | $B_{N-1,0}$ | $B_{N-1,1}$ | ... | $B_{N-1,m+n-2}$ | $B_{N-1,m+n-1}$ |

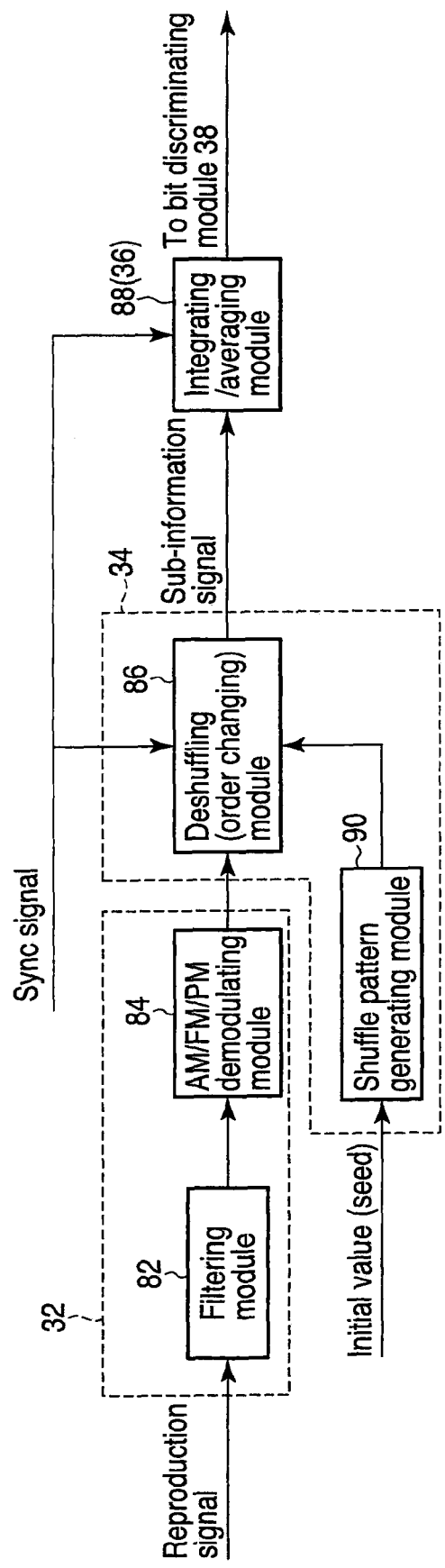
F I G. 11

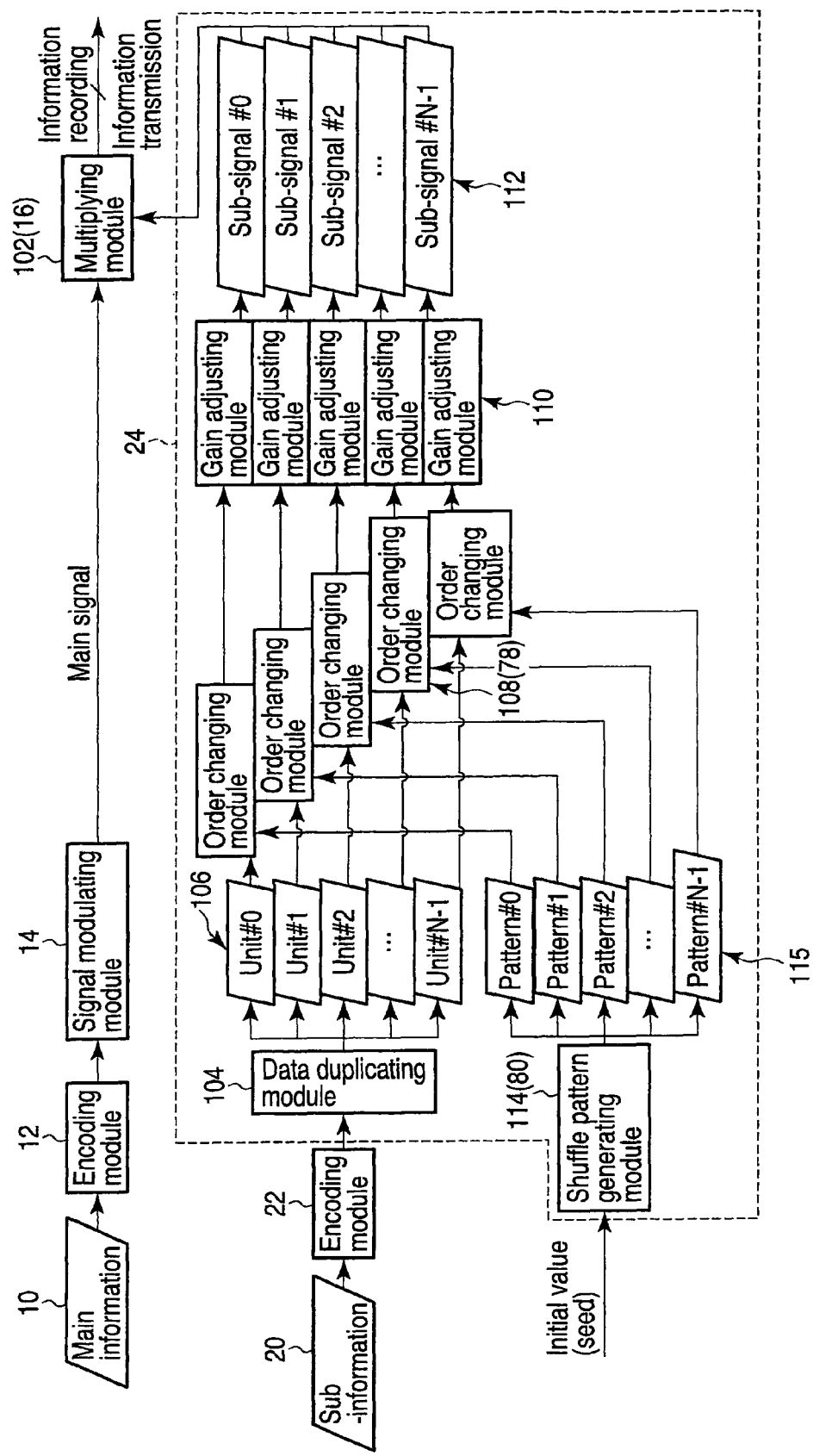
F I G. 15

US 7,949,071 B2

SIGNAL PROCESSING SYSTEM AND INFORMATION STORAGE MEDIUM

CROSS-REFERENCE TO RELATED APPLICATIONS

This application is based upon and claims the benefit of priority from Japanese Patent Application No. 2008-304832, filed Nov. 28, 2008, the entire contents of which are incorporated herein by reference.

BACKGROUND

1. Field

One embodiment of the invention relates to an information recording/reproducing system which records sub-information by superimposing the sub-information on main information, an information transmission system which transmits sub-information by superimposing the sub-information on main information, and an information storage medium.

2. Description of the Related Art

In general, in many cases, in information recording/reproduction and information transmission/reception, in addition to main information which is composed of user data, address information for synchronism/arrangement recognition or sub-information which is used for copyright protection etc. is recorded/reproduced or transmitted. In a typical example of the method of recording/transmitting sub-information, sub-information as well as main information is encoded in such a format that the sub-information is inserted or mixed in the main information at predetermined intervals, and the main information and sub-information are transmitted by the same modulation method. In another example of the method, main information and sub-information are subjected to different encoding/modulating processes to generate recording signals or transmission signals, and then the generated signals are superimposed.

There is a case in which an encryption key for use in a copyright protection system such as CSS (Content Scramble System), or information relating to this is used as sub-information. In the copyright protection system, in order to encrypt a content that is a work and to keep an encryption key thereof secret, this encryption key is encrypted by another encryption key and the encrypted encryption key is recorded together with encrypted content, thereby preventing an illegal copy.

Such a copyright protection system effectively functions in a reproduction-only apparatus (player), but cannot prevent an illegal copy in a personal computer environment. There are violators who conduct an illegal copy by copying the whole encrypted content including the encrypted encryption key. In this situation, patent applications for copyright protection systems, in which secret information recording/reproducing systems are introduced, were filed (Document 1: Jpn. Pat. Appln. KOKAI Publication No. 2000-3560 (paragraphs 0007 to 0009); Document 2: Jpn. Pat. Appln. KOKAI Publication No. 2003-109302 (paragraphs 0010); and Document 3: Jpn. Pat. Appln. KOKAI Publication No. 2003-122637 (paragraph 0011)).

In these systems, secret information, on which confidentiality is required for copyright protection, is recorded by a physical modulation method that is different from the modulation method of main information, thereby making difficult reproduction and duplication of the secret information. In each of these systems, sub-information is substituted for and embedded in main information in the process of encoding (the encoding including error correction encoding and code modulation).

In each of Documents 1 to 3, the secret information modulation/recording method employs different modulation methods for the main information and the secret information in the information encoding process. Thereby, in an apparatus having only a main information reproduction system, the reproduction of secret information is disabled, and no trace of secret information remains in the processed result of the main information reproduction system. When consideration is given to the structure of the combination between an ordinary optical disc drive and a personal computer which is connected to this optical disc drive, there is an advantage that no secret information is included in data bits that are read out from the personal computer, whereby bit-by-bit copy (copy in units of a bit) can be prevented. In addition, in manufacturing optical discs storing secret information, a secret information recording system is provided to only an authorized specific disc manufacturer. On the other hand, in manufacturing an apparatus which plays back the optical disc, a secret information reproducing system is provided to only an authorized specific reproducing apparatus manufacturer. Thereby, the secret information recording/reproducing system can be disclosed to the limited, necessary range. The secret information recording/reproducing system is disclosed to only reliable manufacturers through examinations and contracts. Thus, this also serves to prevent the manufacture of illegal discs and the manufacture of illegal reproducing apparatuses by illegal manufacturers.

The superimposition of sub-information on main information means that the presence of the sub-information is a disturbance to the main information. Thus, there is a demand that the level of the sub-information be lowered to such a level that the sub-information be fully reproduced and that the reproduction of the main information may not be affected by the sub-information. However, there has been no standard for quantitatively determining a proper level of the sub-information.

In addition, since the secret information is embedded in the main information in the process of encoding, as described above, it is possible that the secret information recording/reproducing system may be decoded when a code analysis is executed by a professional. The professional, in this context, refers to, for example, an illegal disc manufacturer having manufacturing equipment and expertise which are equivalent to those of an authorized optical disc manufacturer.

The above-described problem similarly occurs in the case of signal transmission using a transmission medium in place of a storage medium, as in the case of executing recording/reproduction on the information storage medium.

As described above, when the sub-information is superimposed on the main information, a proper level of the sub-information has been unclear.

Besides, when confidential sub-information is embedded in main information, the possibility remains that the recording/reproducing system of the sub-information is decoded by a special analysis, and the sub-information is disclosed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing an example of a signal recording/reproducing/transmission system according to an embodiment of the present invention;

FIG. 2 is an exemplary block diagram showing an example of an encoding module shown in FIG. 1;

FIG. 11 shows an example of sub-information discrimination module in FIG. 1;

FIG. 15 shows an example of a specific circuit on a signal recording/signal transmission side in FIG. 1.

DETAILED DESCRIPTION

Figure 3:
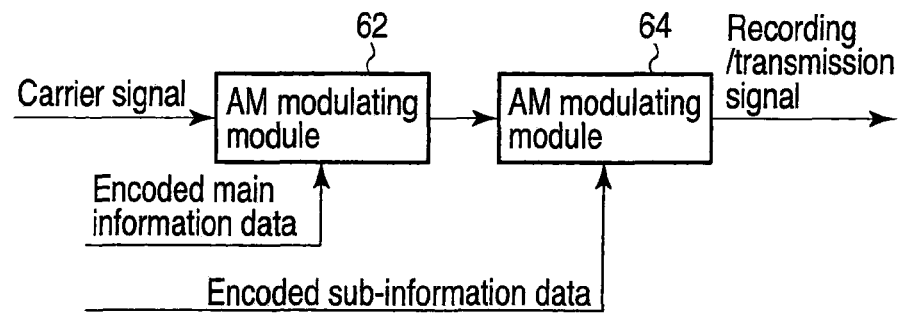
FIG. 3 is an exemplary block diagram showing an example of the part of signal modulating modules 14 and 16 shown in FIG. 1.

Various embodiments according to the invention will be described hereinafter with reference to the accompanying drawings. In general, according to one embodiment of the invention, a signal processing system which superimposes a sub-information signal on a main information signal for transmission or recording, the system comprising a first encoder configured to encode main information; a second encoder configured to encode sub-information; a first modulator configured to modulate a carrier based on an output of the first encoder; a duplicating module configured to duplicate an output of the second encoder to generate encoded sub-information units; and a second modulator configured to amplitude-modulate an output of the first modulator based on the encoded sub-information units, wherein the second modulator is configured to amplitude-modulate with $\sigma/(\mu \times (2^N)^{1/2})$ being 0.4 or less, wherein a noise power of a transmission path or a storage medium is $\sigma^2$, a number of the encoded sub-information units is N, signal levels after amplitude modulation, which correspond to bit 1 and bit 0 of the encoded sub-information units, are A and B, and a level difference A−B is $\mu$.

FIG. 1 shows the basic structure of an information recording/reproducing/transmission system according to a first embodiment of the present invention. Main information 10 is encoded by an encoding module 12. The encoding module 12 executes error correction encoding, modulation encoding aiming at, e.g. band restriction corresponding to a storage medium or a communication path, and sync code addition.

Encoded data, which is output from the encoding module 12, is supplied to a signal modulating module 14. The signal modulating module 14 modulates a carrier signal (not shown) on the basis of the encoded data of the main information, and outputs a recording signal which is to be recorded on a medium, or a transmission signal which is to be transmitted to a communication path. There are various kinds of signal modulation methods, for instance, amplitude modulation, frequency modulation, phase modulation, and combinations thereof. The present invention does not depend on the signal modulation method.

Sub-information 20 is encoded by an encoding module 22. The encoding module 22 executes a process similar to the process that is executed by the encoding module 12. Encoded data, which is output from the encoding module 22, is supplied to a code duplicating/shuffling/scrambling module 24. The code duplicating/shuffling/scrambling module 24 duplicates and multiplexes the encoded data of the sub-information in a predetermined unit of data so that an integration process can be executed at a time of reproduction. At the same time, the code duplicating/shuffling/scrambling module 24 executes a shuffling process for shuffling the order of data between the predetermined units of duplicated data. The unit of shuffling may be a bit unit or a code unit, or the unit of shuffling may span a plurality of units of data. From the standpoint of confidentiality, it is desirable to execute shuffling with a finer unit. Instead of shuffling, or in addition to shuffling, scrambling may be executed. Thereby, the confidentiality is further enhanced. A scramble sequence used for scrambling may be successively generated by using specific information as a seed, or a predetermined pattern may be used. As the specific information, use may be made of secret information, such as a disc unique ID, a separately transmitted ID, or a secret key. When the specific information is kept secret by other means, the confidentiality of sub-information is further enhanced. As a pattern generating method, use may be made of a method using an M-sequential random number. Further, if a firmer random number sequence is desired, use may be made of a sequence using firm block ciphers such as AES.

The output of the signal modulating module 14 and the output of the code duplicating/shuffling/scrambling module 24 are supplied to a signal modulating module 16. The signal modulating module 16, like the signal modulating module 14, modulates the output of the signal modulating module 14 on the basis of the output of the code duplicating/shuffling/scrambling module 24.

Thereby, the modulated signal of the main information and the modulated signal of the sub-information are, in a superimposed state, recorded/reproduced in/from the storage medium, or transmitted via the transmission medium. The superimposition of signals depends on the modulation methods of the signal modulating module 14 and 16. For example, when the main information is amplitude-modulated and the sub-information is frequency-modulated, the signal superimposition is executed by frequency-modulating the frequency of the modulated signal of the main information on the basis of the modulated signal of the sub-information. For the frequency modulation, use may be made of an ordinary frequency modulator utilizing PLL. When both main information and sub-information are amplitude-modulated, the signal superimposition can be executed by an adder or a multiplier. No matter which of the modulation methods is adopted, it is necessary that the sub-information signal be minute and reproducible by integration, that the information amount of the sub-information signal be smaller than the information amount of the main information signal, that a frequency band, in which a high recording efficiency and a high transmission efficiency can be expected, be allocated to the main information signal, and that the main information signal component be sufficiently suppressed by the filtering in discrimination of the sub-information signal. Therefore, it is desirable that the frequency band of the sub-information signal be sufficiently lower than the frequency band of the main information signal. When the central frequency in the recording/reproducing/transmission frequency band of the main information signal is $F_{main}$, it should suffice if the central frequency $F_{sub}$ in the recording/reproducing/transmission frequency band of the sub-information signal is $F_{sub} < F_{main}/100$. In addition, the sub-information may be superimposed over the entirety of the main information signal, or may be imposed on only a part of the main information signal.

A signal, which has been read out of the medium, or a signal, which has been transmitted, is supplied to a signal detecting module 26. A signal, which is detected by the detecting module 26, is delivered to a main information reproduction module 28 and a sub-information signal detecting module 32. The main information reproduction module 28 executes a bit discriminating/demodulating/decoding process, and reproduces main information 30. The bit discrimination process is a process of executing predetermined filtering, phase synchronization and wave detection, in accordance with the signal modulation method and the characteristics of the storage medium/communication path. The sub-information signal detecting module 32 executes a synchronization process in a predetermined signal unit corresponding to the signal modulation method of the sub-information. In this case, as a sync signal, use may be made of a sync signal in the main information. When a sync signal is included in the sub-information, this sync signal may be used. Before and after the synchronization process of the sub-information signal, a filtering process, a phase synchronization process or a wave detection process is chosen in accordance with the sub-information signal modulation method and the characteristics of the communication path. The sub-information signal, which has been subjected to the synchronization process, is rearranged in the original data order by a deshuffling/descrambling module 34. Thereafter, signal integration is executed in units of duplicated data by a signal integrating module 36, whereby the effect of signal component emphasis of the sub-information signal and the effect of noise suppression can be obtained. In addition to the integration process, an averaging process for limiting arithmetic bit digits may be executed. The output of the signal integrating module 36, which has been adequately emphasized for bit discrimination, is processed by a bit discriminating module 38 and a demodulating and decoding module 40, and sub-information 42 is reproduced.

FIG. 2 shows an example of the encoding module 12 (or 22). An address (packet) information adding module 52 adds address information to the main information 10 or sub-information 20 (pre-encoding data). Then, a correction code adding module 54 adds correction codes to the main information 10 or sub-information 20, and a code modulating module 56 modulates/encodes the resultant information. A sync signal adding module 58 adds a sync signal to the output of the code modulating module 56, and modulated/encoded data is generated.

FIG. 3 to FIG. 6 show examples of the specific structure of the part of the signal modulating modules 14 and 16.

FIG. 3 shows an example in which the modulation methods of both main information and sub-information are amplitude modulation (AM). A carrier signal is supplied to an AM modulating module 62, and an output signal of the AM modulating module 62 is supplied to an AM modulating module 64. Encoded main information data from the encoding module 12 is supplied to the AM modulating module 62, and the carrier signal is amplitude-modulated by the encoded main information data. Encoded sub-information data from the encoding module 22 is supplied to the AM modulating module 64. The carrier signal, which has been amplitude-modulated by the encoded main information data in the AM modulating module 62, is further amplitude-modulated by the encoded sub-information data. Thereby, the modulated signal of the main information and the modulated signal of the sub-information are superimposed.

Figure 4:
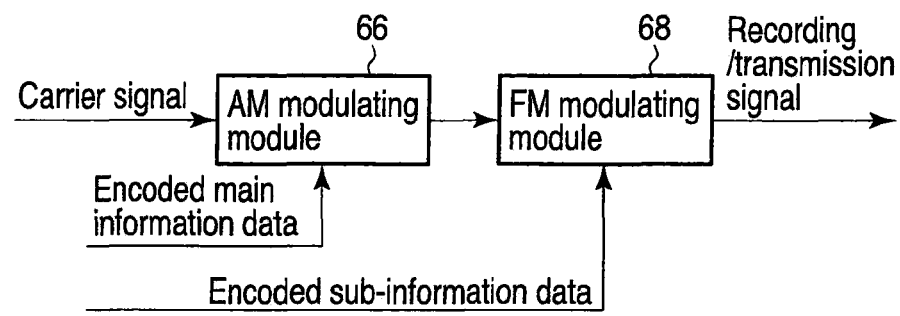
FIG. 4 is an exemplary block diagram showing another example of the part of the signal modulating modules 14 and 16 shown in FIG. 1.

FIG. 4 shows an example in which the modulation method of main information is amplitude modulation, and the modulation method of sub-information is frequency modulation (FM). A carrier signal is supplied to an AM modulating module 66, and an output signal of the AM modulating module 66 is supplied to an FM modulating module 68. Encoded main information data from the encoding module 12 is supplied to the AM modulating module 66, and the carrier signal is amplitude-modulated by the encoded main information data. Encoded sub-information data from the encoding module 22 is supplied to the FM modulating module 68. The carrier signal, which has been amplitude-modulated by the encoded main information data in the AM modulating module 66, is frequency-modulated by the encoded sub-information data. Thereby, the modulated signal of the main information and the modulated signal of the sub-information are superimposed.

Figure 5:
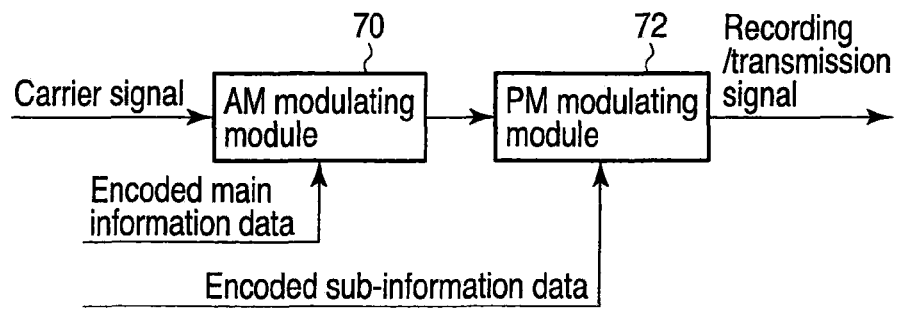
FIG. 5 is an exemplary block diagram showing still another example of the part of the signal modulating modules 14 and 16 shown in FIG. 1.

FIG. 5 shows an example in which the modulation method of main information is amplitude modulation, and the modulation method of sub-information is phase modulation (PM). A carrier signal is supplied to an AM modulating module 70, and an output signal of the AM modulating module 70 is supplied to a PM modulating module 72. Encoded main information data from the encoding module 12 is supplied to the AM modulating module 70, and the carrier signal is amplitude-modulated by the encoded main information data. Encoded sub-information data from the encoding module 22 is supplied to the PM modulating module 72. The carrier signal, which has been amplitude-modulated by the encoded main information data in the AM modulating module 70, is phase-modulated by the encoded sub-information data. Thereby, the modulated signal of the main information and the modulated signal of the sub-information are superimposed.

Figure 6:
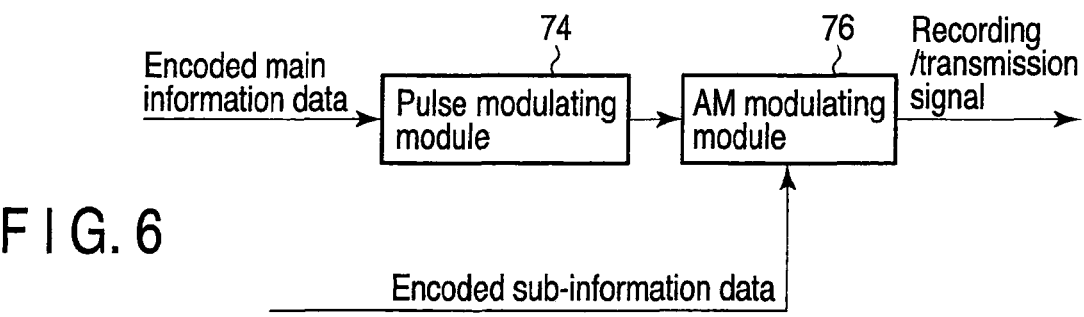
FIG. 6 is an exemplary block diagram showing still another example of the part of the signal modulating modules 14 and 16 shown in FIG. 1.

FIG. 6 shows an example in which the modulation method of main information is pulse modulation (e.g. pulse width modulation, pulse amplitude modulation), and the modulation method of sub-information is amplitude modulation. A carrier signal is supplied to a pulse modulating module 74, and an output signal of the pulse modulating module 74 is supplied to an AM modulating module 76. Encoded main information data from the encoding module 12 is supplied to the pulse modulating module 74, and the carrier signal is subjected to pulse modulation, such as pulse width modulation or pulse number modulation, by the encoded main information data. Encoded sub-information data from the encoding module 22 is supplied to the AM modulating module 76. The carrier signal, which has been pulse-modulated by the encoded main information data in the pulse modulating module 74, is amplitude-modulated by the encoded sub-information data. Thereby, the modulated signal of the main information and the modulated signal of the sub-information are superimposed.

Figures 7, 8, 9:
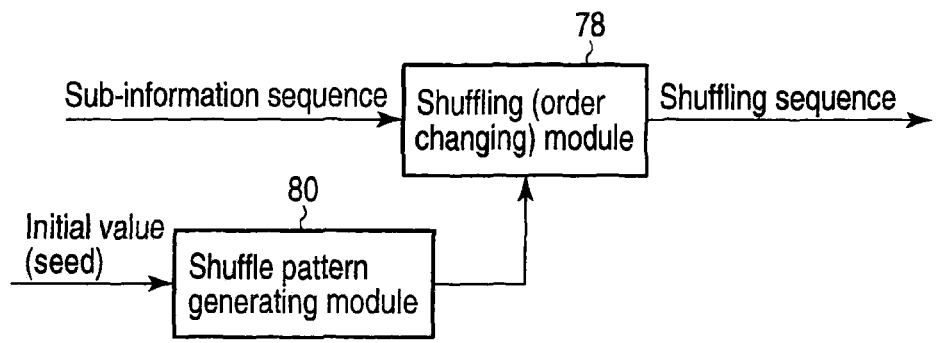
FIG. 7 shows an example of an encoding process of an encoding module 22 in FIG. 1.
FIG. 8 shows an example of a duplicating/shuffling process of a code duplicating/shuffling/scrambling module 24 shown in FIG. 1.
FIG. 9 shows another example of the duplicating/shuffling process of a code duplicating/shuffling/scrambling module 24 shown in FIG. 1.

FIG. 7 shows an example of encoding of sub-information. An error correction code ("Secondary Data Parity") according to a predetermined method is generated and added to sub-information, and thus a sub-information data block ("Secondary Data Block") is composed. As the error correction code, use is made of an arbitrary code such as a general cyclic code or a block code. The code after error coding may further be subjected to a predetermined code modulation process for band or pattern restriction. For example, use is made of an arbitrary method such as a modulation method for replacing a bit sequence of an arbitrary length with a different sequence according to a predetermined table. In particular, in order to reduce the influence on main information and to make the detection of sub-information easier, a code modulation method with a DC suppression effect is desirable. Examples of such a code modulation method include a modulation system including a DSV (Digital Sum Value) control bit of a code, and a Bi-phase modulation system. In addition, when a sync signal is included in sub-information, a pattern for synchronization may be embedded in a predetermined unit of a sub-information data block.

Figure 10:
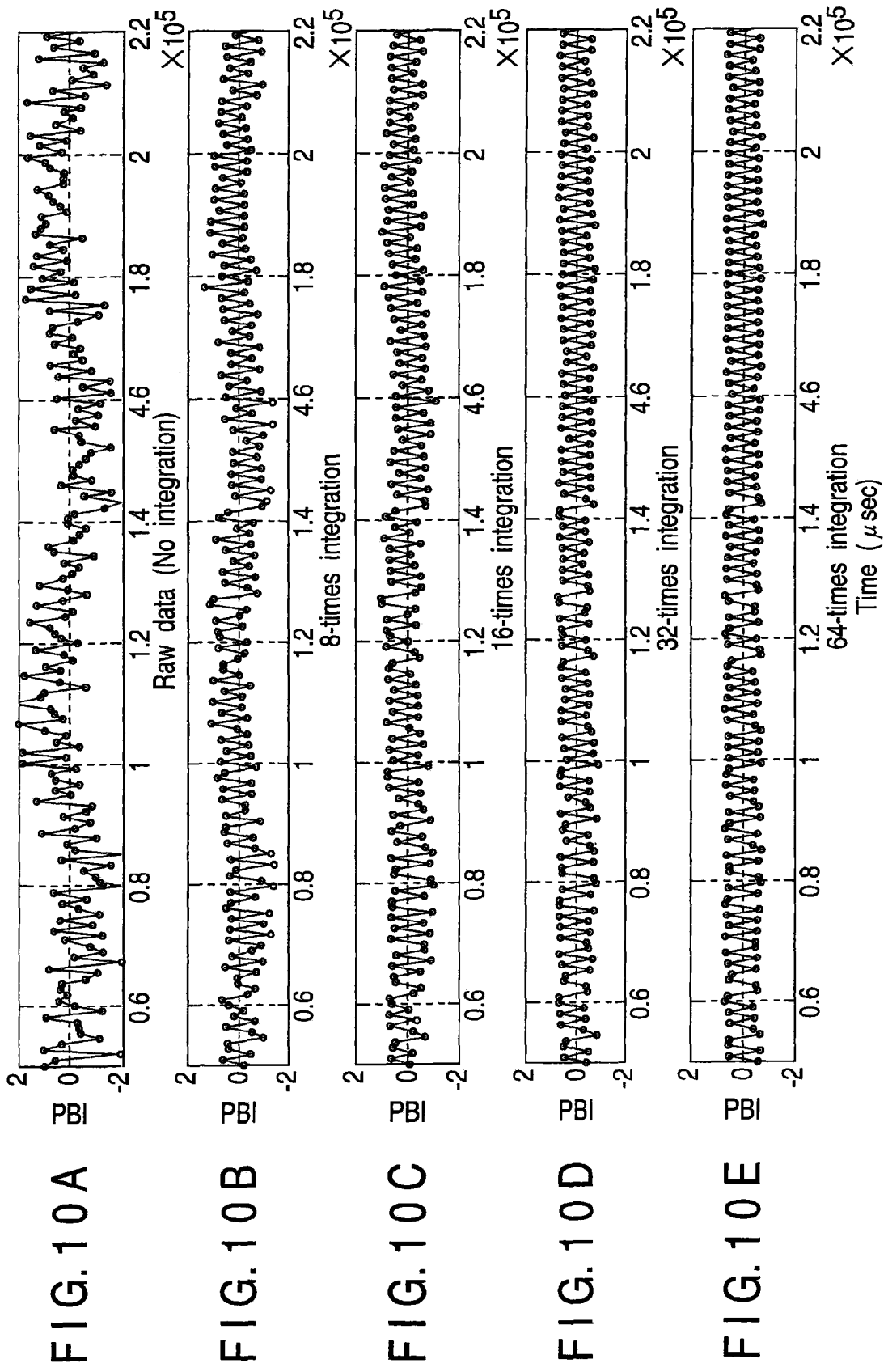
FIGS. 10A, 10B, 10C, 10D and 10E show examples of the process of a signal integrating module 36 shown in FIG. 1.
Figure 12B:
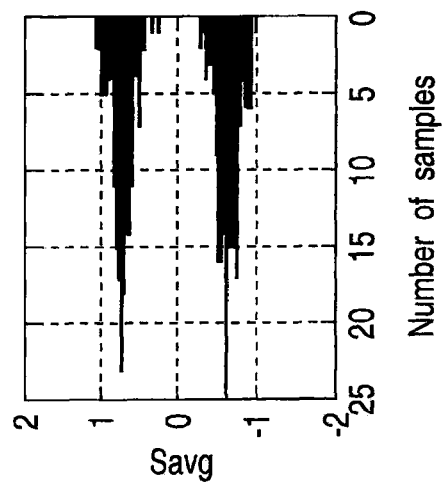
FIGS. 12A and 12B show examples of the distribution of a detection signal of sub-information in FIG. 1.
Figure 12A:
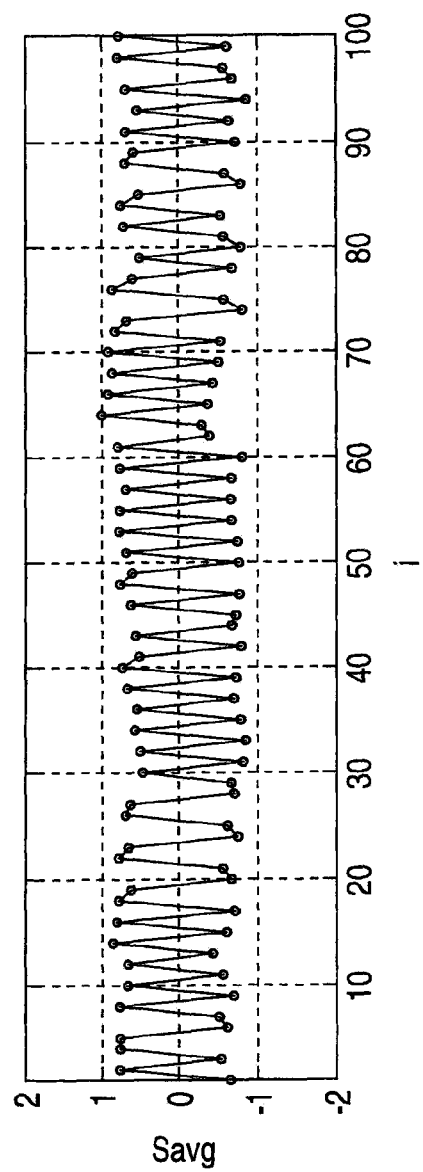

In general, an integration process has an effect of improving a signal-to-noise ratio (S/N). For example, if a noise characteristic is white, an improvement effect of $3 \log_2(N)$ dB is expectable by an N-number of times of integration. Specifically, even if a sub-information signal is minute and an S/N ratio to noise in a communication path or to noise due to a main information signal is 0 dB, the S/N ratio can be improved up to 15 dB by 32-times integration. FIGS. 10A to 10E show improvements of the S/N ratio by integration. FIG. 10A shows raw data, and FIGS. 10B, 10C, 10D and 10E show data after 8-times integration, 16-times integration, 32-times integration and 64-times integration, respectively. In this case, the integration process is executed in units of a bit on the basis of the same data. Instead of executing the signal integration, a method may be adopted in which after bit discrimination is executed in each data unit, a majority decision is executed with respect to discriminated bits on the basis of the same data, thereby enhancing the discrimination reliability. As the signal-to-noise ratio becomes lower, the influence of the sub-information upon the main information decreases, and the confidentiality of the sub-information signal is improved, but a greater number of times of integration is needed for reproduction. FIG. 12A shows a sub-information signal waveform after integration, and FIG. 12B shows a distribution thereof. In this example, determination is executed by binarization with a threshold set at 0 level. It is indicated that the detection ratio is higher as the separability of distributions centering on −1 and 1 is higher.

Figure 13:
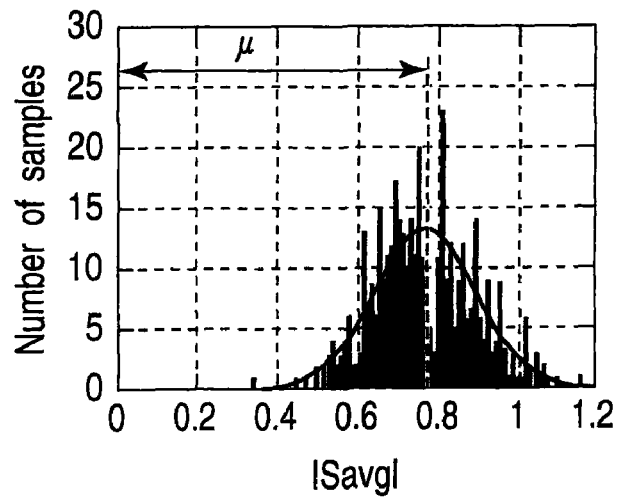
FIG. 13 shows an example of evaluation of the detection signal of sub-information in FIG. 1.

FIG. 13 shows a method of evaluating a detection signal of sub-information based on the above principle. FIG. 13 is a graph plotting absolute values of signals, when the center (threshold value) of two distributions corresponding to code polarities is set at 0. In this case, values having correlation to the detection ratio of the code polarities can be calculated by a distance $\mu$ from the center of the distribution to the threshold value and a standard deviation $\sigma$ of the distribution. The $\mu$ value corresponds to the modulation signal amount of sub-information. Hence, it is understood that the use of $\sigma$ and $\mu$ is advantageous as a method of determining the signal detection ratio of sub-information, the confidentiality and the reduction of influence on main information. For example, as the means for evaluating the detection ratio, there is a method using alp or an error function, and the upper limit thereof is specified. As the means for evaluating the confidentiality and the degree of influence on the main information, the upper limit of the $\mu$ value is specified. The lower limits of the $\sigma/\mu$ and $\mu$ may be specified.

As shown in FIG. 1, the sub-information, after code duplicating, is shuffled. The shuffling is a factor of disturbance in the reproduction of sub-information, but the shuffling is effective in whitening noise due to the main information or noise in the information storage medium or transmission path. When the main information or noise has properties which are characteristic of the frequency band that adversely affects the sub-information signal, it is thought that the noise cannot sufficiently be suppressed by the integration and, as a result, an adequate improvement in signal-to-noise ratio cannot be expected. In particular, in recent years, in order to improve the increase in density of information storage media and the increase in transmission density according to the high speed of information transmission, most of frequency bands, which can secure quality, are allocated to the recording/reproduction and transmission of main information. In this case, it is considered difficult to allocate frequency bands, which can secure a sufficient signal-to-noise ratio for the detection of sub-information, to the frequency bands of a recording signal/transmission signal of sub-information. It is thus desirable to execute whitening by shuffling. When sub-information requires confidentiality, it is possible to expect the effect of making it difficult to easily estimate the integration order. As regards the pattern of shuffling, use may be made of a predetermined order, as shown in FIG. 8, or use may be made of a numerical sequence which is successively generated on the basis of specific information by a predetermined pattern generation method, as shown in FIG. 9. In either case, the pattern is generated on the basis of a predetermined random number sequence. As regards the random number generation method, a method using an M-sequence random number may be used. If a firmer random number sequence is desirable, use may be made of a sequence which utilizes firm block ciphers such as AES. In the case of the successive generation in combination with specific information, secret information, such as a disc unique ID, a separately transmitted ID or a secret key, may be used as the specific information. When the specific information is kept secret by other means, the confidentiality of sub-information is further enhanced.

In FIG. 8, unit #0 to unit #N−1 indicate an N-number of duplications of sub-information, and a sub-information data unit ("Secondary Data Unit") indicates sub-information after shuffling. The N-number of duplication unit #0 to duplication unit #N−1 are composed of (m+n) byte information B. Shuffling is executed by assigning any one of the bytes $D_1$ to $D_{m+n-1}$ of sub-information to the byte information B.

FIG. 9 shows an example of hardware which executes shuffling. Sub-information is supplied to a shuffling module 78, and an output of a shuffle pattern generating module 80 is supplied to the shuffling module 78. An initial value or a seed (hereinafter referred to as "seed") is supplied to the shuffle pattern generating module 80, a random number corresponding to the initial value is generated, and a shuffle pattern corresponding to the random number is supplied to the shuffling module 78. The shuffling module 78 shuffles the sub-information according to the shuffle pattern. As the seed, use may be made of secret information, such as a disc unique ID, a separately transmitted ID or a secret key. The seed may be changed each time, or a single seed may always be used.

A sub-information signal, which has been recorded on the medium, or a sub-information signal, which has been transmitted, is processed by a discrimination module as shown in FIG. 11. A reproduction signal (or a transmission signal) of the sub-information signal, which is output from the signal detecting module 26, is subjected to a noise suppression process by a filter (band pass filter) module 82, and then subjected to a detection process by an AM/FM/PM demodulating module 84 according to the signal modulation method of the sub-information. In this case, as the cutoff frequency of the filter module 82, use is made of a cutoff frequency which can sufficiently suppress the main information signal component, since the reference frequencies of the main information and sub-information are adequately separated. Thereafter, referring to a sync signal included in the sub-information or a sync signal acquired from the main information, a deshuffling module 86 executes a deshuffling process according to a shuffle pattern which is separately generated by a shuffle pattern generating module 90. After the sub-information signal of the original order is restored by the deshuffling, an integrating/averaging module 88 executes an integration process in units of the same data. In this case, in addition to the integration process, an averaging process for arithmetic bit digit restriction may be executed. The signal, after the integration, is input to a rear-stage bit discrimination process. In the meantime, when the sub-information is scrambled, a descrambling process is also executed after the deshuffling process.

By decreasing the sub-information signal to such a degree that a single data unit is not easily discriminable, the reproduction of the sub-information can be disabled without an integration process on the demodulation side. Further, by changing the integration order by shuffling, the reproduction of sub-information can be made difficult in an illegal apparatus in which the details of both the integration and shuffling are not recognized. When the single data unit of encoded sub-information is M bytes and the unit of shuffling is 1 byte, the number of patterns of shuffling is a factorial M! of M. In addition, if the number of integrations, which are necessary for the reproduction of sub-information, is N, the number of all shuffling patterns is M!×N. Hence, in order for an illegal person, who does not understand the details of the integration and shuffling, to specify the shuffling pattern by the execution of all numbers, he/she needs to execute an M!×N number of trials. For example, when the time that is needed for one trial is 1 ms, M is 16 and N is 32, all-number trials requires 20,000 years or more. On the other hand, when the time that is needed for one trial is 1 ms, M is 8 and N is 32, all-number trials require about 21 minutes. Besides, it is desirable to select a highly random shuffling pattern in order to obtain the effect of whitening of sub-information, and the number of trials can exponentially be reduced by repeating the specifying of a partial shuffling pattern. It is thus desirable that the M!×N number of patterns be as great as possible. In particular, M, compared to N, has a greater effect on the increase in number of patterns, and it is desirable to set M at 16 or more.

Next, a specific example is described. The case of transmitting sub-information by amplitude modulation is described by way of example. FIG. 15 shows a transmission-side signal processing unit. Sub-information 20 is encoded by the encoding module 22, and a signal duplicating module 104 generates an N-number of duplications 106 (unit #0 to unit #N−1) each composed of a predetermined data unit. In this case, each unit may comprise a single piece of sub-information, a plurality of pieces of sub-information, or a part of a single piece of sub-information. Each unit is shuffled by an order changing module 108.

On the other hand, an initial value (seed) is supplied to a shuffle pattern generating module 114 (80 in FIG. 9), random numbers corresponding to the initial value are generated, and shuffle patterns 115 (pattern #0 to pattern #N−1) corresponding to the random numbers are supplied to the order changing modules 108 (shuffling module 78 in FIG. 9). The order changing module 108 shuffles each unit of sub-information on the basis of order information which is indicated by each pattern generated by the shuffle pattern generating module 114.

Subsequently, in order to determine the modulation amount of amplitude modulation by a rear-stage multiplying module 102 (signal modulating module 16 in FIG. 1), each of the order-changed units is sent to a gain adjusting module 110, and a sub-signal 112 (sub-signal #0 to sub-signal #N−1) is generated. In this case, the adjustment amount in the gain adjusting module 110 is determined on the basis of the possible number of times of integration, the upper limit of which is the number of duplications, N, of sub-information, and the narrow band noise level in the sub-information transmission band in the transmission path. The signal duplicating module 104, order changing modules 108, gain adjusting modules 110 and shuffle pattern generating module 114 constitute the code duplicating/shuffling/descrambling module 24 in FIG. 1.

Figure 14:
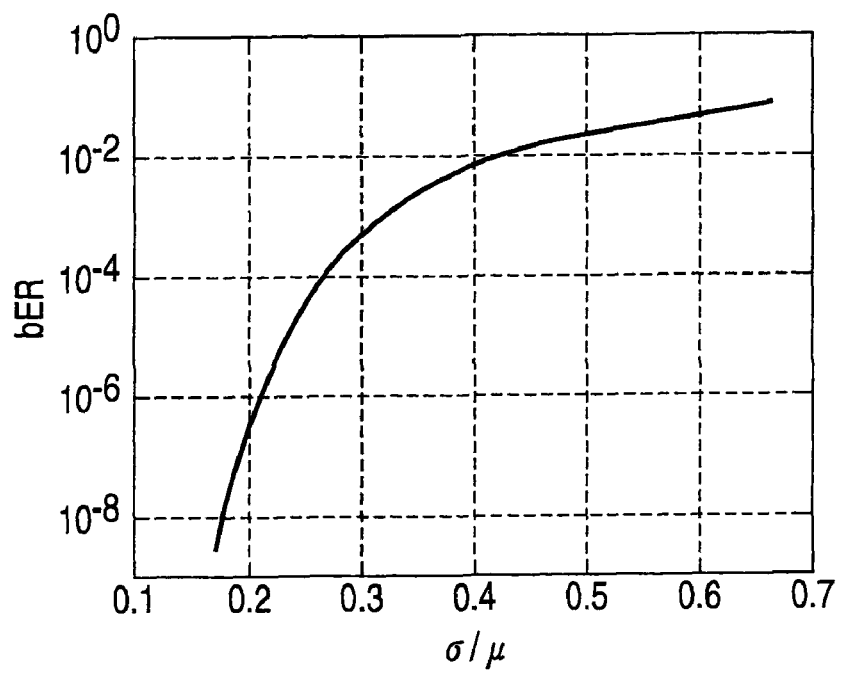
FIG. 14 shows an example of the relationship between $\rho/\mu$ and a bit error rate.

As has been described above, the use of σ and μ is advantageous as a method of determining the signal detection ratio of sub-information, the confidentiality and the reduction of influence on main information. In general, the value a can be set as a known value by measuring the narrow band noise in the sub-information transmission band in the transmission path. In addition, when the sub-information signal has a signal level "A" in relation to the code 1 and has a signal level "B" in relation to the code 0, the sub-signal index value σ/μ, which is calculated on the basis of the sub-information signal amplitude difference μ=A−B and the noise power $\sigma^2$, has correlation to the error rate (bit error rate), as shown in FIG. 14. From the above, the signal-to-noise ratio is increased by the above-described number of times of integration, N, by 3 $\log_2(N)$ dB, that is, by $(2^N)^{1/2}$ in simple ratio. Thus, the sub-signal index value is improved by the integration, with the relationship of $\sigma/(\mu \times (2^N)^{1/2})$. In the block correction code, it is desirable that the practical error ratio be $10^{-2}$ or less. Therefore, it is understood, from FIG. 14, that the target value of the sub-signal index value after the integration needs to be 0.4 or less.

Figure 16:
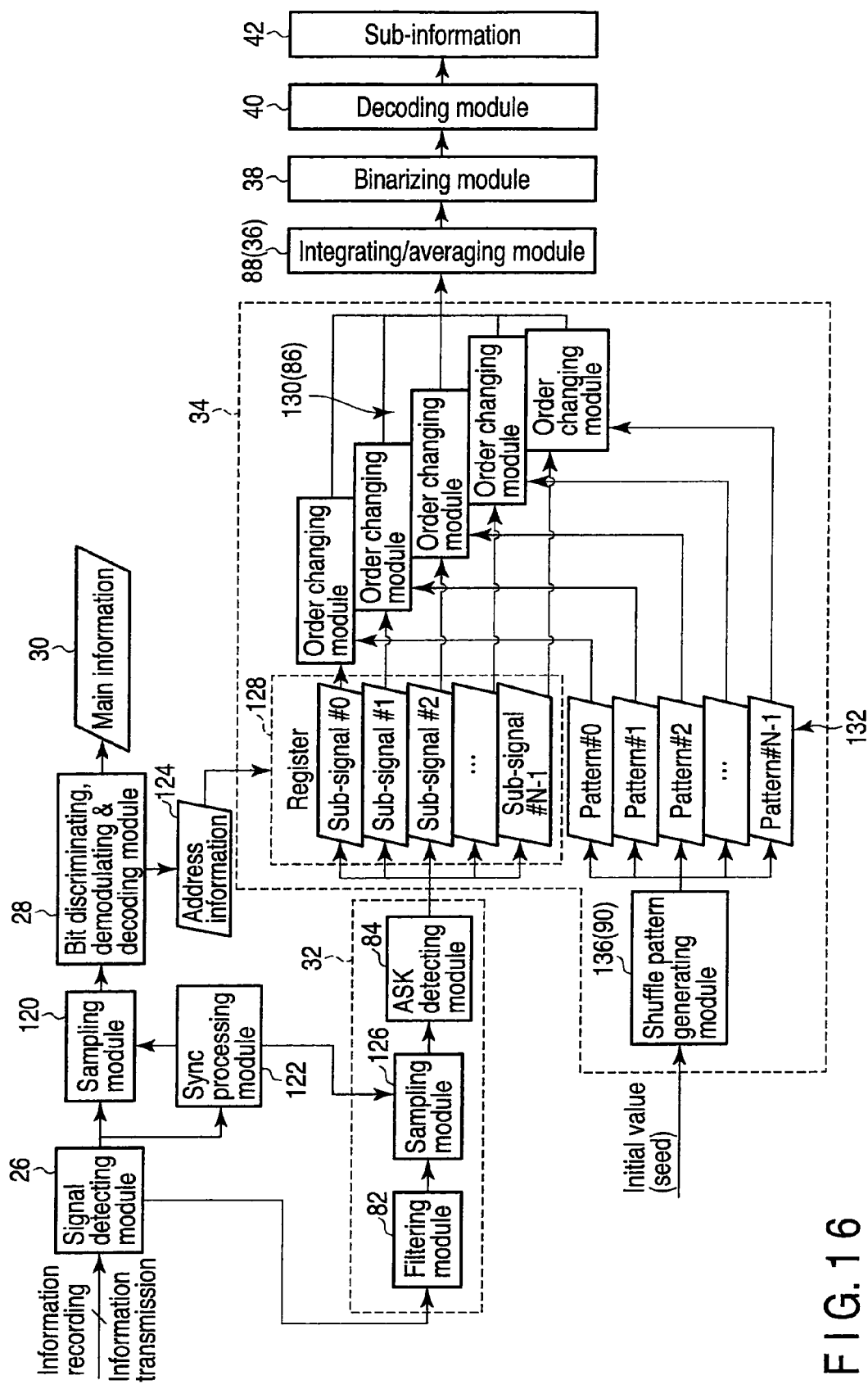
FIG. 16 shows an example of a specific circuit on a signal reproduction/transmission signal reception side in FIG. 1.

FIG. 16 shows an example of a reception-side signal processing unit of the sub-information signal which has been processed on the transmission side as shown in FIG. 15. The sub-information signal, which has been transmitted from the circuit of FIG. 15, is detected by the signal detecting module 26 by a predetermined signal detection method, and then input to a main information processing unit and a sub-information processing unit. In the main information processing unit, a synchronization process is executed on the basis of the signal, and a sampling module 120 executes sampling with a predetermined clock which is generated by a sync processing module 122. The sampled main information signal is subjected to a decoding process, such as a bit discrimination, demodulation and correction process, in the bit discriminating/demodulating/decoding module 28, and the main information signal is reproduced as main information 30.

On the other hand, in the sub-information processing unit, too, after a filtering process is executed by a filtering module 82, a sampling module 126 executes sampling with the clock which is generated by the sync processing module 122. Then, an ASK detecting module 84 executes an ASK detection process. Sub-signal sequences of the detection signal are stored in a register 128 on the basis of address information 124 which is reproduced by the bit discriminating/demodulating/decoding module 28 of the main information processing unit. The respective sequences are deshuffled by order changing modules 130 (86 in FIG. 11) on the basis of order information, which is indicated by each pattern generated by a shuffle pattern generator 136 (90 in FIG. 11). Thereafter, an integration process is executed by an integrating/averaging module 88 (signal integrating module 36 in FIG. 1), and signal components are emphasized. Subsequently, a binarizing module 38 (bit discriminating module 38 in FIG. 1) executes bit discrimination, and the decoding module 40 reproduces the sub-information.

Although FIGS. 15 and 16 describe the signal transmission system, a signal recording/reproducing system can similarly be realized by replacing "transmission" with "recording/reproduction" in the above description.

According to the above-described embodiment, when sub-information is superimposed on main information by modulating a main information signal by the sub-information, the sub-information modulation amount is decreased so that the reproduction in each sub-information unit is difficult, and the recording signal level is intentionally lowered. In addition, the transmission frequency band of the sub-information is made sufficiently low, relative to the main information, and the adverse effect on the signal quality and reproduction performance of the main information can be suppressed. Moreover, the sub-information signal is duplicated and multiply recorded, and the reproduction of the sub-information is enabled only by integrating signals which are read out from plural sub-information units on the detection side. Thereby, the sub-information detection performance can sufficiently be secured. Specifically, when sub-information is superimposed on main information and is recorded/reproduced or transmitted, it is possible both to suppress the influence on the recording/reproduction/transmission of the main information signal (e.g. the recording/reproduction quality, transmission quality, recording/reproduction performance, and transmission performance), and to secure the sufficient recording/reproduction performance and transmission performance of the sub-information.

When the sub-information is superimposed, if there is noise of a frequency band which is difficult to suppress even by the above-described integration, the noise is whitened by shuffling, and thereby robust sub-information reproduction can be realized. Furthermore, when the sub-information is a value which is used for, e.g. copyright protection and needs to be prevented from illegal, easy copy/recognition, the integration order is shuffled so as not to be easily estimated, and thereby illegal sub-information reproduction can be prevented.

In addition, since the secret information is embedded in the main information in the process of signal modulation, and not in the process of encoding, even if a professional code analysis is executed, the recording/reproducing system and transmission system of the secret information are not decoded.

As has been described above, according to the present embodiment, when sub-information is recorded/reproduced or transmitted, it is possible both to suppress the influence on the recording/reproduction/transmission of the main information signal (e.g. the recording/reproduction quality, transmission quality, recording/reproduction performance, and transmission performance), and to secure the sufficient recording/reproduction performance and transmission performance of the sub-information.

According to the present embodiment, when the sub-information is used for, e.g. copyright protection and needs to be prevented from easy copy/recognition, the integration order is shuffled so as not to be easily estimated, the recognizability of the presence of the sub-information itself can be suppressed.

The present invention is applicable to a recording/reproducing system which records/reproduces a signal in/from an information storage medium, and to a signal transmission system which transmits a signal via a transmission medium.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

What is claimed is:

1. An information transmission system for generating a transmission signal by superposing sub-information on main information, the system comprising:
   a first encoder configured to encode main information;
   a second encoder configured to encode sub-information;
   a first modulator configured to modulate a carrier based on an output of the first encoder;
   a duplicating module configured to duplicate an output of the second encoder to generate encoded sub-information units, each of the units comprising data units;
   a shuffling module configured to shuffle an order of the data units, which form the encoded sub-information units generated by the duplicating module, based on a value unique to encoding units of the second encoder; and
   a second modulator configured to amplitude-modulate the output of the first encoder based on the encoded sub-information units in which the order of the data units is shuffled,
   wherein the second modulator is configured to amplitude-modulate with $\sigma/(\mu \times (2^N)^{1/2})$ being 0.4 or less, wherein a noise power of the transmission signal is $\sigma^2$, a number of the encoded sub-information units is N, signal levels after amplitude modulation, which correspond to bit 1 and bit 0 of the encoded sub-information units, are A and B, and a level difference A−B is $\mu$.

* * * * *